US006693724B1

(12) United States Patent
Min

(10) Patent No.: US 6,693,724 B1
(45) Date of Patent: Feb. 17, 2004

(54) APPARATUS AND METHOD CONVERTING CONTINUOUS TONE DATA TO MULTIPLE-VALUED DATA

(75) Inventor: Kyoung-Cheol Min, Suwon (KR)

(73) Assignee: Samsung Electronics Co., Ltd., Suwon (KR)

(*) Notice: Subject to any disclaimer, the term of this patent is extended or adjusted under 35 U.S.C. 154(b) by 0 days.

(21) Appl. No.: 09/338,573

(22) Filed: Jun. 23, 1999

(30) Foreign Application Priority Data

Jun. 23, 1998 (KR) .............................. 98-23683

(51) Int. Cl.[7] .............................. G06F 15/00; G06K 1/00
(52) U.S. Cl. ...................... 358/1.9; 358/534; 358/465; 358/3.2; 358/536; 358/448; 358/3.21; 382/270
(58) Field of Search ................................. 358/534, 535, 358/536, 456, 3.13, 1.9, 523, 3.21, 3.22, 454, 443, 3.2; 382/296, 270, 163

(56) References Cited

U.S. PATENT DOCUMENTS

| | | | | | |
|---|---|---|---|---|---|
| 4,752,822 A | * | 6/1988 | Kawamura | ................... | 358/523 |
| 4,941,057 A | * | 7/1990 | Lehmbeck et al. | ......... | 358/443 |
| 4,987,498 A | * | 1/1991 | Shimazaki | ................... | 358/3.2 |
| 5,040,080 A | * | 8/1991 | Scholten | ..................... | 358/3.07 |
| 5,204,916 A | * | 4/1993 | Hamilton et al. | ............ | 382/296 |
| 5,463,720 A | * | 10/1995 | Granger | ...................... | 358/1.9 |
| 5,526,140 A | * | 6/1996 | Rozzi | .......................... | 358/535 |
| 5,572,600 A | * | 11/1996 | Tajima et al. | ................ | 382/163 |
| 5,903,713 A | * | 5/1999 | Daels et al. | ................. | 358/1.9 |
| 5,966,507 A | * | 10/1999 | Lin | ............................. | 358/1.9 |
| 6,067,406 A | * | 5/2000 | Van Hoof et al. | ........... | 358/1.9 |
| 6,275,303 B1 | * | 8/2001 | Fukaya | ......................... | 358/1.9 |
| 2002/0051213 A1 | * | 5/2002 | Yoshiaki | ..................... | 358/296 |

OTHER PUBLICATIONS

A.U.Agar, "A Spectral Model for Halftone Color Prediction", Proceedings of The IEEE International Conference on Image Processing, pp. 456–459, Vancouver, BC, Canada, Sep. 10–13, 2000.*

* cited by examiner

Primary Examiner—Kimberly Williams
Assistant Examiner—Melanie Vida
(74) Attorney, Agent, or Firm—Robert E. Bushnell, Esq.

(57) ABSTRACT

An image data processing apparatus determines whether an input element provided by a computer is either a command for processing continuous tone data or continuous tone data. When the input element provided by the computer is a continuous tone data processing command, a parameter (period, angle, form of a macroscopic dot) received by a parameter input unit is replaced by an approximate value realized by a multiple-valued recorder, a continuous tone screen threshold-valued matrix is selected on the basis of the parameter replaced by the parameter replacement unit, and continuous tone data is converted to multiple-valued data in accordance with the selected threshold-valued matrix for outputting halftone data to the multiple-valued recorder.

33 Claims, 4 Drawing Sheets

FIG. 3
| PERIOD OF MACROSCOPIC DOT | EXAMPLE 1 OF ANGLE AND FORM | EXAMPLE 2 OF ANGLE AND FORM | EXAMPLE 3 OF ANGLE AND FORM |
|---|---|---|---|
| 200.0 | 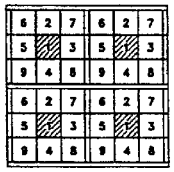 | 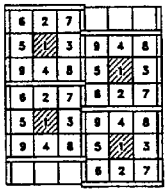 | 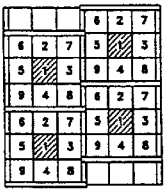 |
| 189.7 | 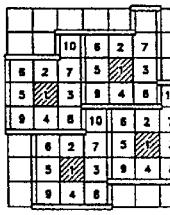 | 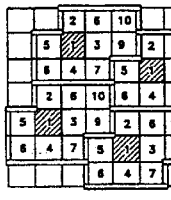 | |
| 150.0 | 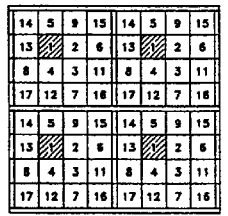 | 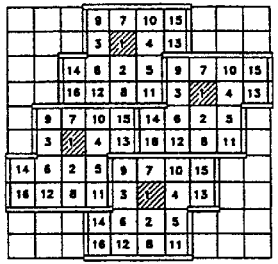 | |
| 120.0 | 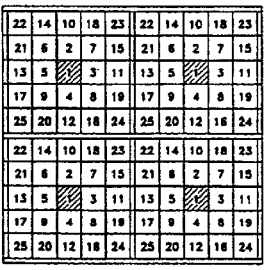 | 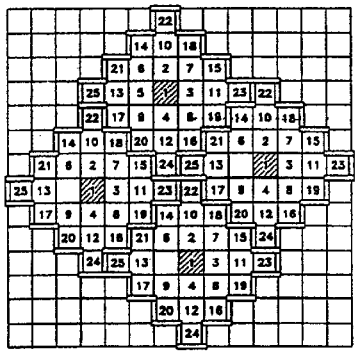 | |

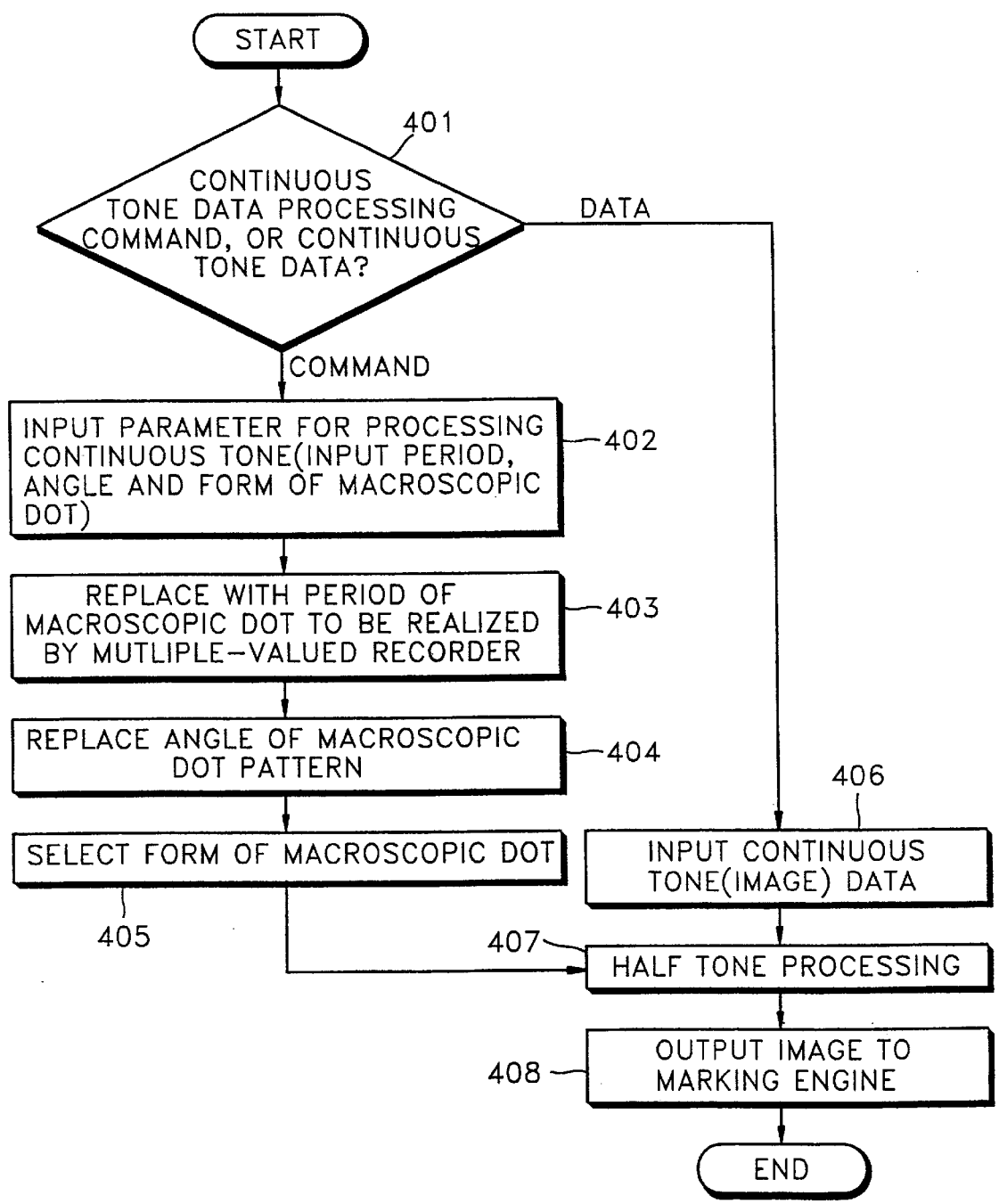

APPARATUS AND METHOD CONVERTING CONTINUOUS TONE DATA TO MULTIPLE-VALUED DATA

CLAIM OF PRIORITY

This application makes reference to, incorporates the same herein, and claims all benefits accruing under 35 U.S.C. §119 from an application entitled AN APPARATUS FOR PROCESSING IMAGE DATA earlier filed in the Korean Industrial Property Office on Jun. 23, 1998, and there duly assigned Serial No. 98-23683.

BACKGROUND OF THE INVENTION

1. Field of the Invention

The present invention relates to an image data processing apparatus, and more particularly, to an image data processing apparatus in which an image having a continuous tone can be reproduced by a two-valued dot recorder.

2. Description of the Related Art

A dithering method using a two-valued dot recorder is for expressing a continuous tone, where the continuous tone is to number the degree of the shading, e.g., black is zero and white is 256 for the case in which 256 numbers are used to express the degree of the shading from white to black. According to the dithering method, ON or OFF of the dot is determined by a threshold value varied by the position of a pixel. At this time, the threshold value which is a matrix having the size determined by the number of a tone to be expressed, is determined by the position of the coordinate of an input pixel. For instance, the tone of 65 (0, 1, 2, ..., 64) steps can be expressed in an 8×8 matrix, and the tone of 145 steps can be expressed in a 12×12 matrix.

SUMMARY OF THE INVENTION

To solve the above problems, it is an objective of the present invention to provide an image data processing apparatus capable of easily predetermining the period and the angle of an optimum macroscopic dot in accordance with types of received image data or a user's intention.

Accordingly, to achieve the above objective and other objectives of the present invention, an image data processing apparatus according to the present invention includes:

- an input element determination unit for determining whether an input element provided by a computer is either a command for processing continuous tone data or continuous tone data;
- a parameter input unit for receiving a parameter for processing the continuous tone data, when the input element provided by the computer is a continuous tone data processing command;
- a parameter replacement unit for replacing the parameter received by the parameter input unit to an approximate value realized by a multiple-valued recorder;
- a threshold-valued matrix selection unit for selecting a continuous tone screen threshold matrix on the basis of the parameter replaced by the parameter replacement unit;
- a continuous tone data input unit for receiving the continuous tone data, and for transmitting the received continuous tone data, when the input element provided by the computer is the continuous tone data;
- a continuous tone processing unit for converting continuous tone data transmitted through the continuous tone data input unit to multiple-valued data in accordance with a threshold-valued matrix selected by the threshold-valued matrix selection unit; and
- an output unit for outputting data processed by the continuous tone processing unit to the multiple-valued recorder.

Here, preferably, the parameter comprises at least one of the period, the angle and the form of a macroscopic dot, the period is more early replaced than the angle when the parameter is replaced with an approximate value, and the multiple-valued recorder has a recording ability of steps 2 through 16, for example.

According to the present invention, the received parameter is replaced with the period of the macroscopic dot to be realized by the multiple-valued recorder, the size of the corresponding macroscopic dot is determined, and the threshold-valued matrix for processing a continuous tone is selected according to the angle and the form of the macroscopic dot, and then the image data having the continuous tone is converted to multiple-valued data in accordance with the threshold-valued matrix, to thereby easily predetermine the period and the angle of an optimum macroscopic dot in accordance with types of the received image data or a user's intention.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 3 shows arrangement examples of arranging a macroscopic dot having various angles and forms determined according to an image data processing apparatus of the present invention, and illustrates various examples of a continuous tone screen threshold-valued matrix according to the present invention; and FIG. 4 is a flowchart schematically showing the steps of processing an image using the image processing system of FIG. 2 according to the present invention.

DESCRIPTION OF THE PREFERRED EMBODIMENTS

Figure 1:
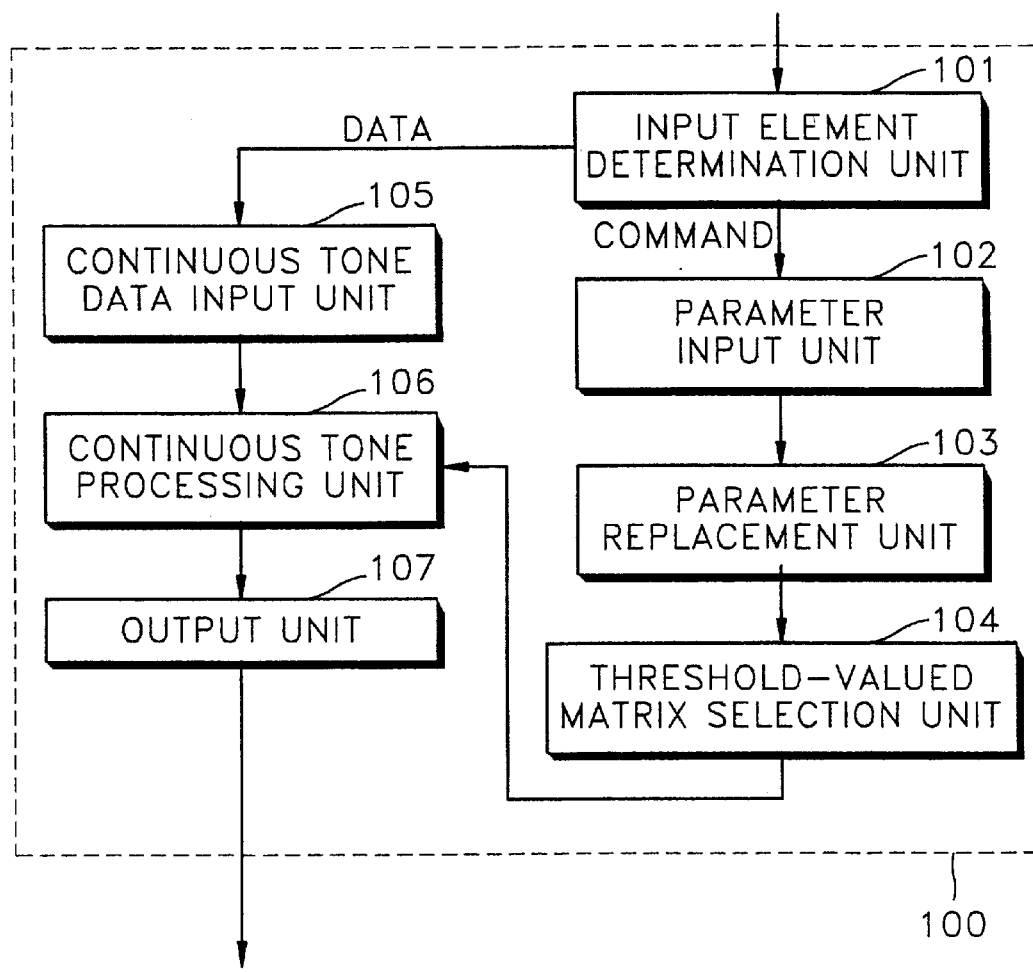
FIG. 1 is a block diagram showing a schematic structure of an image data processing apparatus according to the present invention.

Referring to FIG. 1, an image data processing apparatus 100 according to the present invention includes an input element determination unit 101, a parameter input unit 102, a parameter replacement unit 103, a threshold-valued matrix selection unit 104, a continuous tone data input unit 105, a continuous tone processing unit 106 and an output unit 107. The input element determination unit 101 is for determining whether an input element provided by a computer 201 (FIG. 2) is either a command for processing continuous tone data or continuous tone data. Continuous tone data represents data to number the degree of shading, e.g., black is zero and white is 256 for the case in which 256 numbers are used to express the degree of shading from white to black, for example. The parameter input unit 102 is for receiving a parameter for processing the continuous tone data when an input element provided by the computer is a continuous tone data processing command. The parameter replacement unit 103 replaces the parameter received by the parameter input unit 102 with an approximate value to be realized by a multiple-valued recorder. The approximate-value realized by a multiple-valued recorder represents, for example, the period of a macroscopic dot that the input parameter is replaced so as to be processed by a multiple-valued recorder in accordance with the resolution of the two-valued recorder. The threshold valued matrix selection unit 104 is for selecting a continuous tone screen threshold-valued matrix on the basis of the parameter replaced by the parameter replacement unit 103.

Figure 2:
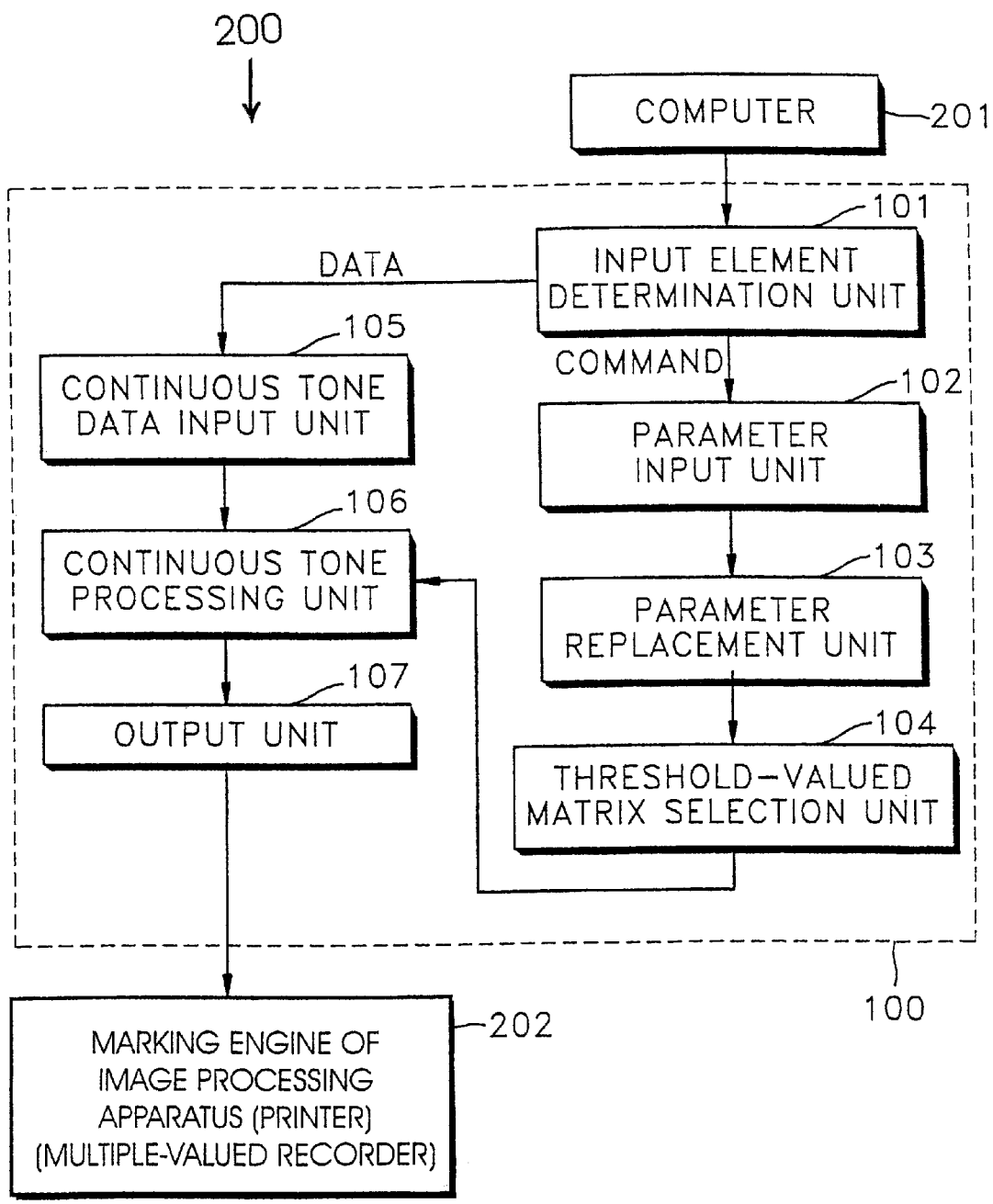
FIG. 2 is a block diagram schematically showing an image processing system employing the image data processing apparatus of FIG. 1 according to the present invention.

Continuing with reference to FIG. 1, the continuous tone data input unit 105 is for receiving the continuous tone data provided by the computer 201 (FIG. 2) and transmitting the received continuous tone data to a sequential apparatus, namely, the continuous tone processing unit 106, for example. The continuous tone processing unit 106 is for converting the continuous tone data received from the continuous tone data input unit 105 to multiple-valued data in accordance with the threshold-valued matrix selected by the threshold-valued matrix selection unit 104. Multiple-valued data represents data into which the continuous tone data is converted so as to be processed by a multiple-valued recorder 202 (FIG. 2) in accordance with a threshold-valued matrix selected by the threshold-valued matrix selection unit 104 when the input element provided by the computer 201 (FIG. 2) is the continuous tone data. The output unit 107 is for outputting the data received from the continuous tone processing unit 106 to the multiple-valued recorder 202 (FIG. 2). Here, the parameters include the period, the angle and the form of the macroscopic dot, where the period is earlier replaced than the angle when the parameter is replaced with the approximate value. Also, the multiple-valued recorder 202 having a recording ability of steps 2 through 16 is used, for example. In this regard, a recording ability of steps 2 through 16 represents the ability of recording (processing) the continuous tone data of 2 through 16 steps. For example, the continuous tone data of 2 (0, 1) steps can be expressed in a 1×1 matrix, and the continuous tone data of 16 (0, 1, 2, . . . , 15) steps can be expressed in a 3×5 matrix.

The image data processing apparatus 100 having the above-described structure is connected to a computer 201 and an image processing apparatus (printer) marking engine 202 as the multiple-valued recording apparatus or multiple-valued recorder so as to thereby form an image processing system 200 of FIG. 2 of the present invention. Also, the units 101 through 107 of image data processing apparatus 100 can be individually or collectively a processor, a microprocessor, or a central processing unit (CPU), for example, having the requisite programming and circuitry for performing the respective functions of the units 101 through 107 of FIGS. 1 and 2.

The steps for processing an image by an image processing system 200 employing the image data processing apparatus 100 having the above-described structure will be described with reference to FIGS. 2 through 4. In this regard, FIG. 3 illustrates arrangement examples of arranging a macroscopic dot having various angles and forms determined according to the image data processing apparatus 100 of the present invention, and illustrates various example of a continuous tone screen threshold-valued matrix according to the present intention. Also, FIG. 4 is a flowchart schematically showing the steps of processing an image using the image processing system 200 of FIG. 2 according to the present invention.

Referring to FIGS. 2 through 4, with particular reference to FIG. 4, in the image data processing apparatus 100 or image processing system 200 of the present invention, the input element determination unit 101 determines whether the input element provided by the computer 201 is either a command for processing the continuous tone data or the continuous tone data (step 401). Thus, when the input element provided by the computer 201 is a continuous tone data processing command, the parameters including the period, the angle and the form of the macroscopic dot are input from the computer 201 to the parameter replacement unit 103 via the parameter input unit 102 (step 402) to control the continuous tone process. Then, the parameter replacement unit 103 replaces the parameter with the period of the macroscopic dot to be realized by a multiple-valued recorder 202 in accordance with the resolution of the two-valued recorder (step 403). Also, the size of the corresponding macroscopic dot is determined. At this time, the functional relationship between the size and the period of the macroscopic dot is as follows:

Size of macroscopic dot=(resolution of two-valued recorder/period of macroscopic dot)$^2$.

Thus, in a two-valued recorder having a resolution of 600 dots/inch, the period of the macroscopic dot according to the size of the macroscopic dot (the number of dots in the macroscopic dot) is shown in Table 1.

TABLE 1

Period of macroscopic dot according to the size of macroscopic dot

| size of macroscopic dot (number of dots) | period of macroscopic dot (lines/inch) |
| --- | --- |
| 4 | 300.0 |
| 5 | 268.3 |
| . | . |
| . | . |
| . | . |
| 9 | 200.0 |
| 10 | 189.7 |
| 11 | 180.9 |
| . | . |
| . | . |
| 16 | 150.0 |
| 17 | 145.5 |
| . | . |
| . | . |
| 64 | 75.0 |

When the size of the macroscopic dot corresponding to the period of the macroscopic dot is determined, the threshold-valued matrix selection unit 104 selects the threshold-valued matrix for processing the continuous tone in accordance with the angle and the form of the various macroscopic dots as shown in FIG. 3 (steps 404 and 405). Step 404 includes replacing the angle of the macroscopic dot pattern, and step 405 includes selecting the form of the macroscopic dot. At this time, the threshold-valued matrix has various patterns according to the form of the macroscopic dot, as illustrated in the threshold-valued matrices in Examples 1, 2 and 3 of FIG. 3, for example. Continuing with reference to FIG. 2 through 4, when the threshold-valued matrix is selected, such as a threshold-valued matrix illustrated in FIG. 3, the continuous tone (image) data is input from the computer 201 through the continuous tone data input unit 105 (step 406), and the continuous tone processing unit 106 converts the received continuous tone data to multiple-valued data for a multiple-valued recorder 202 having a value more than two in accordance with the selected threshold-valued matrix, for example. That is, a half tone processing is performed by the continuous tone processing unit 106, for example (step 407). Here, in this embodiment, since the two-valued recorder is employed in an example of a multiple-valued recorder 202, the continuous tone data is converted to two-valued data of ON or OFF for the two-valued recorder. Then, the output unit 107 outputs the process result to the marking engine 202 of the image processing apparatus (printer) (step 408). Thus, the marking engine 202 reproduces image data having continuous tone on the basis of the half tone-processed two-valued data.

Meanwhile, in step 401 of FIG. 4, when the input element provided by the computer 201 is the continuous tone data, the continuous tone data input unit 105 receives the continuous tone data and transmits it to the continuous tone processing unit 106 (step 406). Then, the continuous tone processing unit 106 converts the received continuous tone data to multiple-valued data for a recorder having a value more than two, for example. That is, half tone processing is performed by the continuous tone processing unit 106 (step 407). The above-described steps 401 through 408 are repeated, as necessary.

As described above, according to the image data processing apparatus of the present invention, the received parameter is replaced with the period of the macroscopic dot realized by the multiple-valued recorder, the size of the macroscopic dot corresponding thereto is determined, and the threshold-valued matrix for processing the continuous tone in accordance with the angle and the form of the macroscopic dot is selected. Thus, image data having the continuous tone is converted to multiple-valued data according to the threshold-valued matrix, and the converted multiple-valued data is output, so as to thereby easily predetermine the period and the angle of an optimum macroscopic dot in accordance with types of the received image data or a user's intention. Therefore, image data having continuous tone using the two-valued recorder can be easily reproduced.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the scope thereof. Therefore, it is intended that the present invention not be limited to the particular embodiments disclosed as the best mode contemplated for carrying out the present invention, but that the present invention include all embodiments falling within the scope of the appended claims.

What is claimed is:

1. An image data processing apparatus, comprising:
   an input element determination unit for determining whether an input element provided by a computer is one of a command for processing continuous tone data and continuous tone data;
   a parameter input unit connected to an output of the input element determination unit for receiving a parameter from the input element determination unit for processing the continuous tone data when the input element provided by the computer is the command for processing continuous tone data;
   a parameter replacement unit connected to an output of the parameter input unit for replacing the parameter received by the parameter input unit with an approximate value realized by a multiple-valued recorder;
   a threshold-valued matrix selection unit for selecting a continuous tone screen threshold-valued matrix on the basis of the parameter replaced by the parameter replacement unit;
   a continuous tone data input unit connected to an output of the input element determination unit for receiving the continuous tone data from the input element determination unit, and for transmitting the received continuous tone data, when the input element provided by the computer is the continuous tone data;
   a continuous tone processing unit connected to an output of the threshold-valued matrix selection unit and to an output of the continuous tone data input unit for converting the continuous tone data transmitted by the continuous tone data input unit to multiple-valued data in accordance with the threshold-valued matrix selected by the threshold-valued matrix selection unit; and
   an output unit for outputting to the multiple-valued recorder the multiple-valued data converted by the continuous tone processing unit.

2. The image data processing apparatus of claim 1, the parameter including at least one of a period, an angle and a form of a macroscopic dot.

3. The image data processing apparatus of claim 2, the period being more early replaced than the angle when the parameter is replaced with the approximate value.

4. The image data processing apparatus of claim 3, the multiple-valued recorder having a recording ability of steps 2 through 16.

5. The image data processing apparatus of claim 1, a period of a macroscopic dot as the parameter being more early replaced than an angle of a macroscopic dot as the parameter, when the parameter is replaced with the approximate value.

6. The image data processing apparatus of claim 5, the multiple-valued recorder having a recording ability of steps 2 through 16.

7. The image data processing apparatus of claim 1, the multiple-valued recorder having a recording ability of steps 2 through 16.

8. The image data processing apparatus of claim 7, the multiple-valued recorder comprising a printer marking engine.

9. The image data processing apparatus of claim 1, the multiple-valued recorder comprising a printer marking engine.

10. The image data processing apparatus of claim 1, the continuous tone processing unit converting the continuous tone data transmitted by the continuous tone data input unit to the multiple-valued data for the multiple-valued recorder having a value more than two in accordance with the selected threshold-valued matrix.

11. The image data processing apparatus of claim 10, the continuous tone processing unit converting the continuous tone data transmitted by the continuous tone data input unit to the multiple-valued data by performing half tone processing.

12. A method for processing image data, comprising the steps of:

determining, in an input element determination unit, whether an input element provided by a computer is one of a command for processing continuous tone data and continuous tone data;

receiving, in a parameter input unit connected to an output of the input element determination unit, a parameter for processing the continuous tone data when the input element provided by the computer is the command for processing continuous tone data;

replacing the parameter received by the parameter input unit with an approximate value realized by a multiple-valued recorder;

selecting a continuous tone screen threshold-valued matrix on the basis of the parameter replaced;

receiving, in a continuous tone data input unit connected to an output of the input element determination unit the continuous tone data when the input element provided by the computer is the continuous tone data;

converting the received continuous tone data to multiple-valued data in accordance with the continuous tone screen threshold-valued matrix selected; and outputting the multiple-valued data to the multiple-valued recorder.

13. The method of claim 12, the parameter including at least one of a period, an angle and a form of a macroscopic dot.

14. The method of claim 13, the period being more early replaced than the angle when the parameter is replaced with the approximate value.

15. The method of claim 14, the multiple-valued recorder having a recording ability of steps 2 through 16.

16. The method of claim 12, a period of a macroscopic dot as the parameter being more early replaced than an angle of a macroscopic dot as the parameter when the parameter is replaced with the approximate value.

17. The method of claim 16, the multiple-valued recorder having a recording ability of steps 2 through 16.

18. The method of claim 12, the multiple-valued recorder having a recording ability of steps 2 through 16.

19. The method of claim 18, the multiple-valued recorder comprising a printer marking engine.

20. The method of claim 12, the multiple-valued recorder comprising a printer marking engine.

21. The method of claim 12, further comprising the step of converting the received continuous tone data to the multiple-valued data for the multiple-valued recorder having a value more than two in accordance with the selected threshold-valued matrix.

22. The method of claim 21, further comprising the step of converting the received continuous tone data to the multiple-valued data including performing half tone processing.

23. An image processing system, comprising:

a computer for selectively providing an input element, the input element being one of a command for processing continuous tone data and continuous tone data;

a multiple-valued recorder for reproducing image data corresponding to the continuous tone data;

an input element determination unit for determining whether the input element provided by the computer is one of the command for processing continuous tone data and the continuous tone data;

a parameter input unit connected to an output of the input element determination unit for receiving a parameter from the input element determination unit for processing the continuous tone data when the input element provided by the computer is the command for processing continuous tone data;

a parameter replacement unit connected to an output of the parameter input unit for replacing the parameter received by the parameter input unit with an approximate value realized by the multiple-valued recorder;

a threshold-valued matrix selection unit for selecting a continuous tone screen threshold-valued matrix on the basis of the parameter replaced by the parameter replacement unit;

a continuous tone data input unit connected to an output of the input element determination unit for receiving the continuous tone data from the input element determination unit, and for transmitting the received continuous tone data, when the input element provided by the computer is the continuous tone data;

a continuous tone processing unit connected to an output of the threshold-valued matrix selection unit and to an output of the continuous tone data input unit for converting the continuous tone data transmitted by the continuous tone data input unit to multiple-valued data in accordance with the threshold-valued matrix selected by the threshold-valued matrix selection unit; and an output unit for outputting to the multiple-valued recorder the multiple-valued data converted by the continuous tone processing unit.

24. The image processing system of claim 23, the parameter including at least one of a period, an angle and a form of a macroscopic dot.

25. The image processing system of claim 24, the period being more early replaced than the angle when the parameter is replaced with the approximate value.

26. The image processing system of claim 25, the multiple-valued recorder having a recording ability of steps 2 through 16.

27. The image processing system of claim 23, a period of a macroscopic dot as the parameter being more early replaced than an angle of a macroscopic dot as the parameter when the parameter is replaced with the approximate value.

28. The image processing system of claim 27, the multiple-valued recorder having a recording ability of steps 2 through 16.

29. The image processing system of claim 23, the multiple-valued recorder having a recording ability of steps 2 through 16.

30. The image processing system of claim 29, the multiple-valued recorder comprising a printer marking engine.

31. The image processing system of claim 23, the multiple-valued recorder comprising a printer marking engine.

32. The image precessing system of claim 23, the continuous tone processing unit converting the continuous tone data transmitted by the continuous tone data input unit to the multiple-valued data for the multiple-valued recorder having a value more than two in accordance with the selected threshold-valued matrix.

33. The image processing system of claim 32, the continuous tone processing unit converting the continuous tone data transmitted by the continuous tone data input unit to the multiple-valued data by performing half tone processing.

* * * * *